United States Patent
Funakubo et al.

(10) Patent No.: US 9,388,912 B2
(45) Date of Patent: Jul. 12, 2016

(54) PROPORTIONAL SOLENOID CONTROL VALVE

(75) Inventors: Yuko Funakubo, Kobe (JP); Noboru Ito, Kobe (JP); Masahiro Matsuo, Akashi (JP)

(73) Assignee: KAWASAKI JUKOGYO KABUSHIKI KAISHA, Kobe-shi (JP)

(*) Notice: Subject to any disclaimer, the term of this patent is extended or adjusted under 35 U.S.C. 154(b) by 82 days.

(21) Appl. No.: 14/130,176

(22) PCT Filed: Jun. 11, 2012

(86) PCT No.: PCT/JP2012/003778
§ 371 (c)(1),
(2), (4) Date: Feb. 7, 2014

(87) PCT Pub. No.: WO2013/011623
PCT Pub. Date: Jan. 24, 2013

(65) Prior Publication Data
US 2014/0209826 A1     Jul. 31, 2014

(30) Foreign Application Priority Data

Jul. 15, 2011   (JP) .................................. 2011-156430

(51) Int. Cl.
*F16K 31/06*     (2006.01)
*F16K 47/02*     (2006.01)

(52) U.S. Cl.
CPC ......... *F16K 31/0613* (2013.01); *F16K 31/0675* (2013.01); *F16K 31/0679* (2013.01); *F16K 31/0686* (2013.01); *F16K 47/023* (2013.01)

(58) Field of Classification Search
CPC ........................... F16K 31/0613; F16K 47/023
USPC .............................................. 251/129.15, 371
See application file for complete search history.

(56) References Cited

U.S. PATENT DOCUMENTS 2,819,121 A * 1/1958 Bourguet ........................ 406/14
4,524,947 A * 6/1985 Barnes ................ F16K 31/0658
251/129.08

(Continued)

FOREIGN PATENT DOCUMENTS

DE     19953936 A1     12/2000
JP     A-63-9788     1/1988

(Continued)

OTHER PUBLICATIONS

International Search Report issued in International Patent Application No. PCT/JP2012/003778 mailed Jul. 24, 2012.

(Continued)

*Primary Examiner* — Kevin Murphy
*Assistant Examiner* — Daphne M Barry
(74) *Attorney, Agent, or Firm* — Oliff PLC

(57) ABSTRACT

Provided is a configuration in which: a spool driven by an electromagnetic proportional solenoid is urged by a spool-returning spring configured to exert urging force in an opposite direction to a driving direction of the electromagnetic proportional solenoid; a mechanical stopper is disposed at the stroke end of the spool; current dither causes a control current to micro-vibrate, the control current driving the electromagnetic proportional solenoid; and the mechanical stopper includes a stopper-urging spring configured to allow the spool to vibrate owing to the current dither even when the spool is in contact with the mechanical stopper. A proportional solenoid control valve with this configuration is capable of reducing hysteresis at the stroke end of the spool by means of the current dither, and controlling the spool in a stable manner over the entire control range including the stroke end of the spool.

2 Claims, 9 Drawing Sheets

(56) References Cited

U.S. PATENT DOCUMENTS

| | | | |
|---|---|---|---|
| 4,886,091 A * | 12/1989 | Coleman | 137/625.65 |
| 6,609,538 B2 * | 8/2003 | Royle | 137/625.65 |
| 2013/0277585 A1 * | 10/2013 | Van Weelden | 251/129.15 |
| 2014/0001385 A1 * | 1/2014 | Scott | 251/129.15 |

FOREIGN PATENT DOCUMENTS

| | | | |
|---|---|---|---|
| JP | A-63-009788 | * | 1/1988 |
| JP | A-5-143166 | | 6/1993 |
| JP | A-6-193767 | | 7/1994 |
| JP | A-11-132355 | | 5/1999 |
| JP | A-2003-148650 | | 5/2003 |

OTHER PUBLICATIONS

Feb. 17, 2015 Extended Search Report issued in European Application No. 12815571.0.

Oct. 10, 2014 Office Action issued in Chinese Application No. 201280030188.3 (with partial translation).

Hydraumatic Department of Guangdong Institute of Machine Tool, "Design and Calculation for Proportional Electro Hydraulic Valve," *Machine Tool and Hydraulics*, vol. 2, pp. 7-31, May 1, 1977.

* cited by examiner

PROPORTIONAL SOLENOID CONTROL VALVE

TECHNICAL FIELD

The present invention relates to proportional solenoid control valves such as proportional solenoid flow control valves and proportional solenoid pressure control valves.

BACKGROUND ART

Conventionally, in a proportional solenoid control valve using an electromagnetic proportional solenoid, components configured to be movable, such as a spool (hereinafter, such components may be collectively referred to as "movable components"), are driven by the driving force of the solenoid in such a direction as to oppose to spring force or hydraulic force so as to control the positions of the movable components and the balance of the force, and thereby a flow rate or pressure is controlled.

As shown in FIG. 6, such an electromagnetic proportional solenoid as described above is configured to generate driving force proportional to an applied current value (control current value), and the aforementioned flow rate or pressure is controlled in accordance with the applied current. FIG. 6 shows an example where solenoid driving force F3 is generated when the value of the applied current is a rated value. For example, in the case of a proportional solenoid directional flow control valve 101 in a first example shown in FIGS. 7A and 7B, FIG. 7A shows a spool 105 located at a neutral position in a standby state. The spool 105 is a movable component movable in an axial direction inside a spool hole 106 formed in a valve body 102. When the spool 105 is in the standby state, if an electromagnetic proportional solenoid 103 is driven as shown in FIG. 7B, then the spool 105 moves in a driving direction V, so that driving force generated by the electromagnetic proportional solenoid 103 becomes equivalent to the spring force of a spool-returning spring 104. In this manner, the degree of opening between a pump port P and an output port A is controlled, and the flow rate from the pump port P to the output port A is controlled in accordance with the applied current. When the spool 105 is returned to the standby state, the output port A comes into communication with a tank port T. The same is true of, for example, a second example shown in FIGS. 8A and 8B where electromagnetic proportional solenoids 123 are provided at both sides of a proportional solenoid control valve 121, i.e., dual-drive system. In the second example, a spool 125 is driven so as to be located at a position where driving force in the driving direction V, the driving force being generated by one of the electromagnetic proportional solenoids 123, becomes equivalent to the spring force of a corresponding one of spool-returning springs 124. In FIGS. 8A and 8B, the same components as the components shown in FIGS. 7A and 7B are denoted by reference numerals that are greater by 20 than the reference numerals of the components shown in FIGS. 7A and 7B, and the description of such common components is omitted.

As another example, in the case of a pilot-type proportional solenoid flow control valve capable of accommodating a great flow rate, control pressure generated by a proportional solenoid pressure-reducing valve configured to control pressure in accordance with an applied current is introduced as pilot pressure into a spring chamber of a main spool. Then, the main spool is driven so as to be located at a position where force derived from the pilot pressure and opposing spring force of a spool-returning spring become equivalent to each other. In this manner, the main spool is driven in an axial direction, and thereby the degree of opening of an oil passage is controlled, such that the flow rate is controlled in accordance with the applied current.

As shown in FIG. 9, generally speaking, an oscillating wave is used as a current applied to the proportional solenoid of such a proportional solenoid control valve. The value of the current varies relative to time. The oscillating current is called current dither, which is an oscillating wave with a predetermined amplitude. Through the application of the current dither, movable components inside the solenoid and movable components driven by the solenoid are caused to always micro-vibrate in the axial direction, so that the sliding friction of the movable components is reduced and hysteresis is reduced.

Moreover, the current dither causes the spool to always micro-vibrate in the axial direction, thereby suppressing hydraulic lock from occurring and always keeping the operation of movable components in a favorable state. The hydraulic lock is a malfunctioning (failed returning) state of the spool. In the hydraulic lock, the spool becomes eccentric with respect to the spool hole; the spool in such an eccentric state is pressed against the side surface of the spool hole by hydraulic pressure; and due to the pressing in the eccentric direction, the spool becomes unable to move in the axial direction. In this respect, also in the case of the aforementioned pilot-type proportional solenoid control valve, movable components of the proportional solenoid pressure-reducing valve micro-vibrate. As a result, the pilot pressure vibrates, and the vibration of the pilot pressure causes micro vibration of the main spool. Consequently, the aforementioned effect of reducing the sliding friction of movable components and effect of suppressing the hydraulic lock can be obtained.

As described above, proportional solenoid control valves are configured such that current dither is added to the applied current for the purpose of reducing hysteresis in control characteristics and preventing malfunctioning.

One of the conventional techniques of the above kind is such that, so a solenoid control valve configured to control a main spool by means of a proportional solenoid pressure-reducing valve, the main spool is formed of a light metal and the surface of the main spool is hardening-treated so that favorable hysteresis performance can be obtained (see Patent Literature 3, for example).

As another example of conventional techniques, there is an operating valve provided with a proportional solenoid pressure-reducing valve configured to drive a spool included in a valve body (see Patent Literature 2, for example).

CITATION LIST

Patent Literature

PTL 1: Japanese Laid-Open Patent Application Publication No. 2003-148650

PTL 2: Japanese Laid-Open Patent Application Publication No. 6-193767

SUMMARY OF THE INVENTION

Technical Problem

The above-described proportional solenoid control valve 101 shown in FIGS. 7A and 7B usually includes a mechanical stopper 111 at the stroke end of the spool 105. In this example, the inner end surface of a closing member 107 serves as the mechanical stopper 111. Accordingly, when the spool 105 comes into contact with the mechanical stopper 111 at the stroke end, even if current dither causes the control current to micro-vibrate, the spool 105 does not vibrate and is in a state where the spool 105 is stopped in contact with the mechanical stopper 111.

The same is true of the proportional solenoid control valve 121 in which the electromagnetic proportional solenoids 123 are provided at both sides as shown in FIGS. 8A and 8B. When the spool 125 reaches its stroke end and a returning spring seat 130 of the spool-returning spring 124 comes into contact with a mechanical stopper 131, even if current dither causes the control current to micro-vibrate, the spool 125 does not vibrate and is in a state where the spool 125 is stopped in contact with the mechanical stopper 131.

Accordingly, when, the spool 105 or 125 comes into contact with the mechanical stopper 111 or 131 at the stroke end, even if current dither causes the applied current to micro-vibrate, the spool 105 or 125 is in a state where the spool 105 or 125 is stopped in contact with the mechanical stopper 111 or 131. This causes a risk of increase in hysteresis around the stroke end and a risk of malfunctioning of the spool 105 or 125. Particularly in a case where the spool's driving force (spring force, pilot pressure, solenoid force) is weak, the influence of sliding resistance and hydraulic locking force on the driving force is great. Accordingly, the aforementioned problems tend to occur.

If, for example, the spool's driving force is increased as a measure to prevent such problems, then the size of the solenoid increases, which results in an increase in the size of the control valve. Alternatively, the mechanical stopper for the spool may be eliminated from the structure. In this case, however, the amount of deflection of the spool-returning spring exceeds its allowable deflection range due to, for example, overshoot of the spool. This causes a risk of spring fatigue (i.e., reduction in spring force) and breakage of the spring. Moreover, since the stroke of the solenoid is limited, if the driving force of the solenoid becomes greater than the spool-returning spring force, then a driving member inside the solenoid comes into contact with the mechanical stopper. The spring force of the spool-returning spring may be set to be great so that the driving member will not come into contact with the mechanical stopper. In this case, however, the designing of the spring is limited, and the control characteristics of the spool are limited. As a result, the freedom in the designing is restricted.

It should be noted that none of the above-described conventional techniques solves the risks of increase in hysteresis and failed returning of the spool when the spool comes into contact with the mechanical stopper at the stroke end.

Solution to Problem

In view of the above, an object of the present invention is to provide a proportional solenoid control valve capable of, even at the stroke end of a driving member or a movable component, reducing hysteresis and suppressing malfunctioning of the movable component by current dither.

In order to achieve the above object, the present invention is a proportional solenoid control valve including: a driver including a driving member driven by an applied current to the driver; a movable component moved by the driving member; a valve body including a sliding hole formed therein, the sliding hole allowing the movable component to move therein; and a return spring configured to urge the movable component in an opposite direction to a driving direction of the driving member, the proportional solenoid control valve being configured to cause, by current dither, the applied current to the driver to micro-vibrate. The proportional solenoid control valve includes a mechanical stopper configured to limit displacement of the driving member or the movable component. The mechanical stopper includes a resilient member configured to allow the driving member or the movable component to vibrate owing to the current dither when the driving member or the movable component is in contact with the mechanical stopper. According to this configuration, even when the driving member or the movable component is in contact with the mechanical stopper, the micro vibration of the driving member or the movable component derived from the current dither can be maintained by means of the resilient member. This makes it possible to reduce hysteresis and suppress malfunctioning of the movable component.

The resilient member may be configured as a stopper-urging spring that exerts urging force in the opposite direction to the driving direction of the driving member. According to this configuration, even when the driving member or the movable component is in contact with the mechanical stopper, expansion and contraction of the stopper-urging spring, which can be readily designed, allow the driving member or the movable component to be kept in a state of micro-vibrating owing to the current dither.

A spring constant and a setting load of the stopper-urging spring may be set such that a vibration amplitude of the driving member or the movable component, the vibration amplitude being derived from the current dither, is secured. According to this configuration, the micro vibration of the driving member or the movable component derived from the current dither can be maintained. This makes it possible to reduce hysteresis and suppress malfunctioning of the movable component.

The proportional solenoid control valve may be configured as a single-drive system in which the driver is provided at an end of one side of the movable component. The mechanical stopper and the stopper-urging spring may be provided between an end of the movable component and the valve body. According to this configuration, the proportional solenoid control valve configured as a single-drive system is capable of reducing hysteresis around the stroke end where driving force is exerted and suppressing malfunctioning of the movable component.

The proportional solenoid control valve may be configured as a dual-drive system in which the drivers are provided at both ends of the movable component, respectively. The mechanical stoppers and the stopper-urging springs may be provided between both the ends of the movable component and the valve body. According to this configuration, the proportional solenoid control valve configured as a dual-drive system is capable of reducing hysteresis around the stroke end of the movable component and suppressing malfunctioning of the movable component regardless of a direction in which driving force is exerted.

In the proportional solenoid control valve, the mechanical stopper and the stopper-urging spring may be provided inside the driver. According to this configuration, the mechanical stopper and the stopper-urging spring are provided inside the driver. This makes it possible to reduce hysteresis around the stroke end of the driving member and suppress malfunctioning of the movable component.

Alternatively, the present invention may be a pilot-type proportional solenoid control valve including: a proportional solenoid pressure-reducing valve; a main movable component driven by pilot pressure that has been reduced by the proportional solenoid pressure-reducing valve; a valve body including a sliding hole formed therein, the sliding hole allowing the main movable component to move therein; and a return spring configured to urge the main movable component in an opposite direction to a direction in which the pilot pressure is exerted, the pilot-type proportional solenoid control valve being configured to cause, by current dither, an applied current to the proportional solenoid pressure-reducing valve to micro-vibrate. The pilot-type proportional solenoid control valve includes a mechanical stopper configured to limit displacement of the main movable component. The mechanical stopper includes a resilient member configured to allow the main movable component to vibrate owing to the current dither when the main movable component is in contact with the mechanical stopper. According to this configuration, also in the pilot-type proportional solenoid control valve, even when the main movable component is in contact with the mechanical stopper at the stroke end, the micro vibration of the main movable component derived from the current dither can be maintained. Thus, the main movable component, which is controlled by the pilot pressure from the proportional solenoid pressure-reducing valve, keeps the micro vibration derived from the current dither, thereby making it possible to reduce hysteresis and suppress malfunctioning of the main movable component.

Advantageous Effects of Invention

According to the present invention, the driving member or the movable component can keep the micro vibration derived from the current dither even at the stroke end. This makes it possible to reduce hysteresis and suppress malfunctioning of the movable component.

BRIEF DESCRIPTION OF DRAWINGS

FIG. 1A is a sectional view showing a standby state; and FIG. 1B is a sectional view in an operating state (where the spool is at its stroke end).

FIG. 2A is a sectional view showing a standby state; and FIG. 2B is a sectional view showing an operating state (where the spool is at its stroke end).

FIG. 3A is a sectional view showing a standby state; and FIG. 3B is a sectional view showing an operating state (where the spool is at its stroke end).

FIG. 4A is a sectional view showing a standby state; and FIG. 4B is a sectional view showing an operating state (where a driving member is at its stroke end);

FIG. 7A is a sectional view showing a standby state; and FIG. 7B is a sectional view showing an operating state (where the spool is at its stroke end).

FIG. 8A is a sectional view showing a standby state; and FIG. 8B is a sectional view showing an operating state (where the spool is at its stroke end).

DESCRIPTION OF EMBODIMENTS

Hereinafter, embodiments of the present invention are described with reference to the drawings. In the embodiments below, a flow control valve is taken as an example of a proportional solenoid control valve, and the description is given with reference to the drawings that only show operating portions around a spool which is a movable component of the flow control valve. In the embodiments below, the description is given by taking, as an example of a resilient member, a stopper-urging spring configured as a coil spring. Further, the left-right direction referred to in the description and the claims corresponds to the left-right direction in FIGS. 1A and 1B.

Figure 1A:
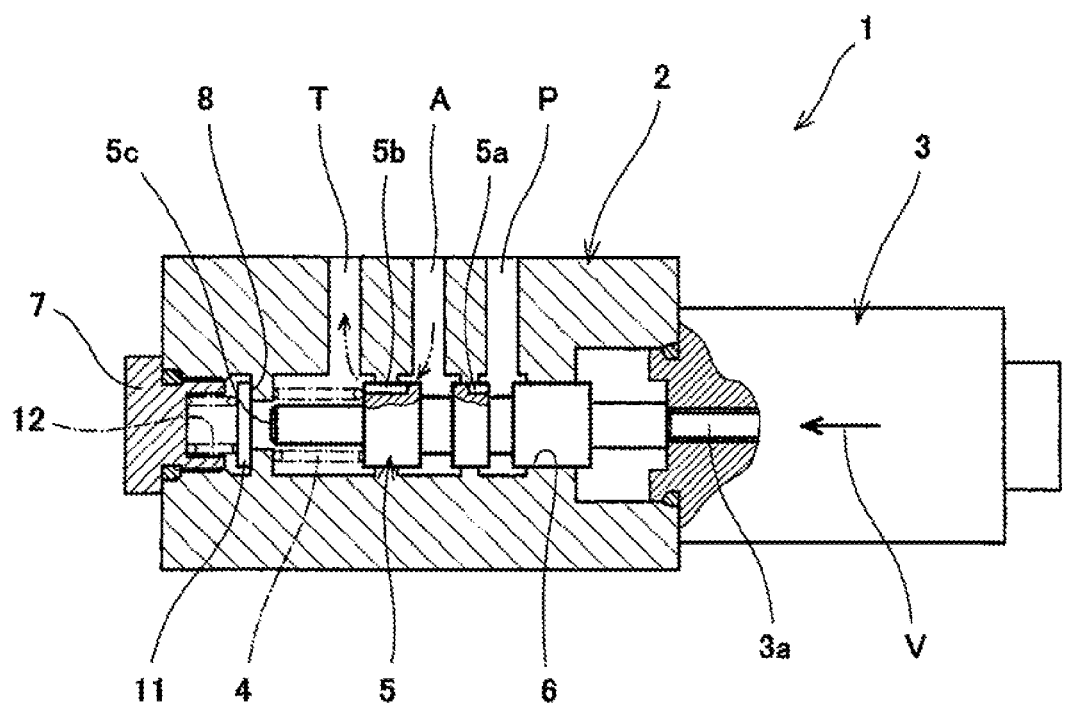
FIGS. 1A and 1B show a spool portion of a proportional solenoid control valve according to Embodiment 1 of the present invention.
Figure 1B:
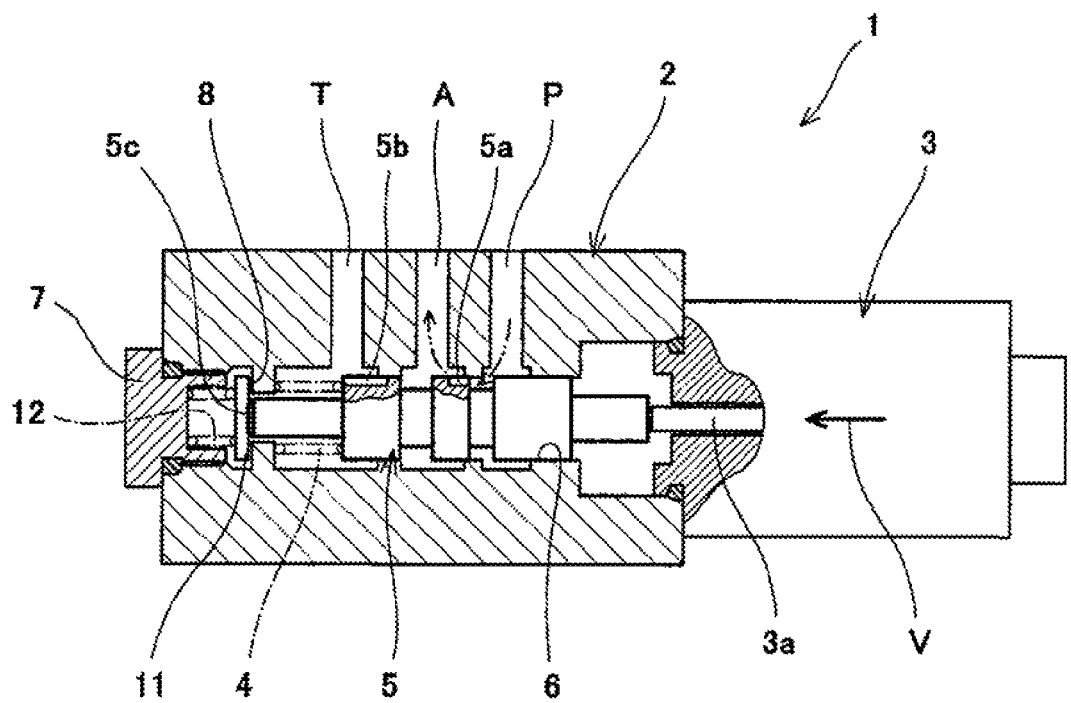

A proportional solenoid control valve 1 according to Embodiment 1 shown in FIGS. 1A and 1B is configured as a single-drive system in which an electromagnetic proportional solenoid (driver) 3 is provided at one side (right side) of a valve body 2, and a spool-returning spring (return spring) 4 is provided at the other side (left, side) of the valve body 2.

The proportional solenoid control valve 1, which is in a standby state in FIG. 1A, is configured such that a spool 5 movable in an axial direction inside a spool hole (sliding hole) 6 formed in the valve body 2 is driven and controlled so as to be located at a position where driving force exerted in a driving direction V by means of a driving member 3a of the electromagnetic proportional solenoid 3 provided at one end of the spool 5 and the spring force of the spool-returning spring 4 provided at the other end of the spool 5, the spring force being exerted in a manner to oppose to the driving force, become equivalent to each other. In this example, the valve body 2 includes a pump port P, an output port A, and a tank port T. The flow rate between each of the ports P, A, and T is controlled by the degree of opening of notches 5a and 5b formed in the spool 5.

A mechanical stopper 11 (which may hereinafter be simply referred to as a "stopper"), with which a spool end face 5c comes into contact, is provided at the left-side end portion of the valve body 2, that is, at the stroke end of the spool 5.

In the present embodiment, a stopper-urging spring 12 configured to urge the stopper 11 in an opposite direction to the urging direction of the electromagnetic proportional solenoid 3 is provided at the opposite side of the stopper 11 to the spool. The stopper-urging spring 12 is attached via a closing member 7 fixed to the valve body 2, and urges the stopper 11 toward a stopper locking portion 8 provided in the valve body 2.

In an operating state shown in FIG. 1B, a rated current is applied to the electromagnetic proportional solenoid 3 of the proportional solenoid control valve 1, and the spool 5 is driven in the driving direction V by the driving force of the electromagnetic proportional solenoid 3 to reach the stroke end, such that the spool end face 5c is in contact with the stopper 11. The spool 5 in this state is urged in an opposite direction to the driving direction V by the spool-returning spring 4 and the stopper-urging spring 12. The stopper-urging spring 12 urges the stopper 11 in the opposite direction to the driving direction V of the electromagnetic proportional solenoid 3. Accordingly, expansion and contraction of the stopper-urging spring 12 cause the spool 5, which is in contact with the stopper 11, and the stopper 11 to micro-vibrate in the axial direction owing to current dither. That is, even when the spool 5 is in contact with the stopper 11, the spool 5 is kept in a state of micro-vibrating in the axial direction together with the stopper 11. In FIG. 1B, a state where the stopper 11 is away from the stopper locking portion 8 is shown in an exaggerated manner. Each two-dot chain line arrow in the drawings indicates a fluid flow.

Accordingly, even when the spool 5 has reached the stroke end, a state where the spool 5 in contact with the stopper 11 is micro-vibrating together with the stopper 11 in the axial direction owing to the current dither is maintained. This makes it possible to reduce hysteresis even at the stroke end and suppress malfunctioning of the spool 5.

Figure 2A:
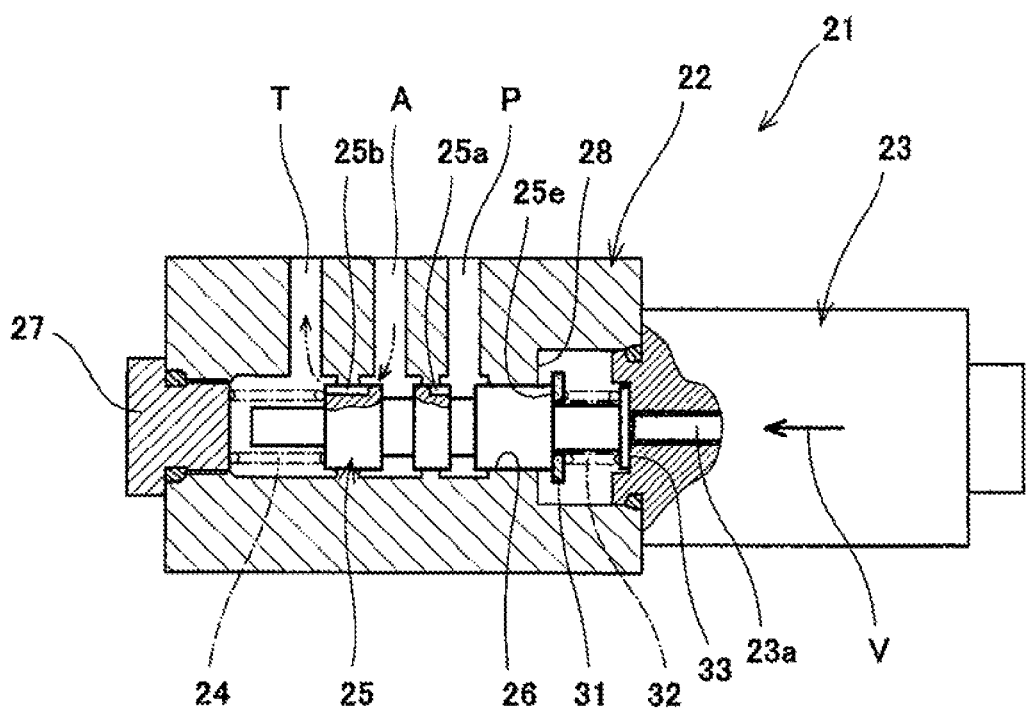
FIGS. 2A and 2B show a spool portion of a proportional solenoid control valve according to Embodiment 2 of the present invention.
Figure 2B:
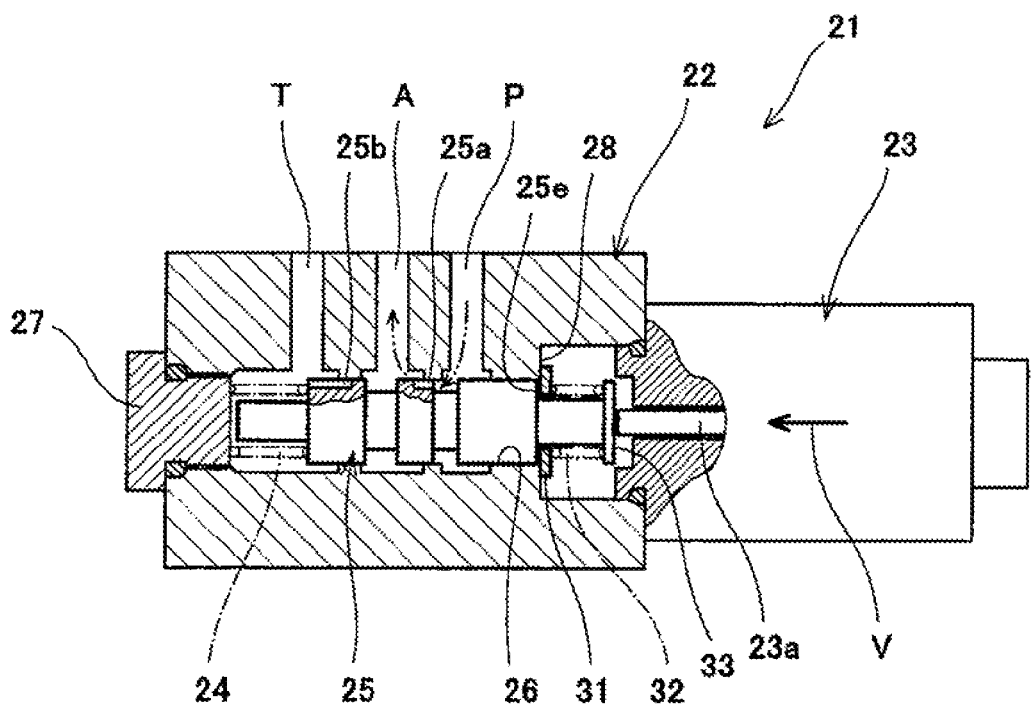

A proportional solenoid control valve 21 according to Embodiment 2 shown in FIGS. 2A and 2B is an embodiment of a single-drive system in which a spool 25 movable in an axial direction inside a spool hole 26 formed in a valve body 22 is provided with a mechanical stopper 31 and a stopper-urging spring 32. It should be noted that, in FIGS. 2A and 2B, the same components as the components described above in Embodiment 1 are denoted by reference numerals that are greater by 20 than the reference numerals of the components described in Embodiment 1, and the description of such common components is omitted.

The proportional solenoid control valve 21, which, is in a standby state in FIG. 2A, is configured such that a flange 33, which is integrally formed on the spool 25, is provided at the electromagnetic proportional solenoid side of the spool 25. The mechanical stopper 31, which is a ring-shaped stopper, is provided at a shoulder portion 25e of the spool 25. The mechanical stopper 31 is movable in the axial direction of the spool 25.

The stopper-urging spring 32 is provided between the flange 33 and the stopper 31. The stopper-urging spring 32 urges the stopper 31 toward the shoulder portion 25e of the spool 25. The edge of the spool hole 26 in the valve body 22 serves as a stopper locking portion 28. The stopper locking portion 28 is positioned such that the stopper 31 comes into contact with the stopper locking portion 28 when the spool 25 reaches the stroke end.

In an operating state shown in FIG. 2B, a rated current is applied to an electromagnetic proportional solenoid 23 of the proportional solenoid control valve 21, and the spool 25 is driven in the driving direction V by the driving force of the electromagnetic proportional solenoid 23 to reach the stroke end, such that the stopper 31 is in contact with the stopper locking portion 28 of the valve body 22. Even when the stopper 31 is in contact with the stopper locking portion 28, extension and contraction of the stopper-urging spring 32 allow the spool 25 to vibrate in the axial direction. Therefore, the spool 25 is kept in a state of micro-vibrating owing to current dither. In the drawing, a state where the stopper 31 is away from the shoulder portion 25e of the spool 25 is shown in an exaggerated manner.

Accordingly, even when the spool 25 is positioned at the stroke end, a state where the spool 25 is micro-vibrating in the axial direction owing to the current dither is maintained. This makes it possible to reduce hysteresis and suppress malfunctioning of the spool 25.

Figure 3A:
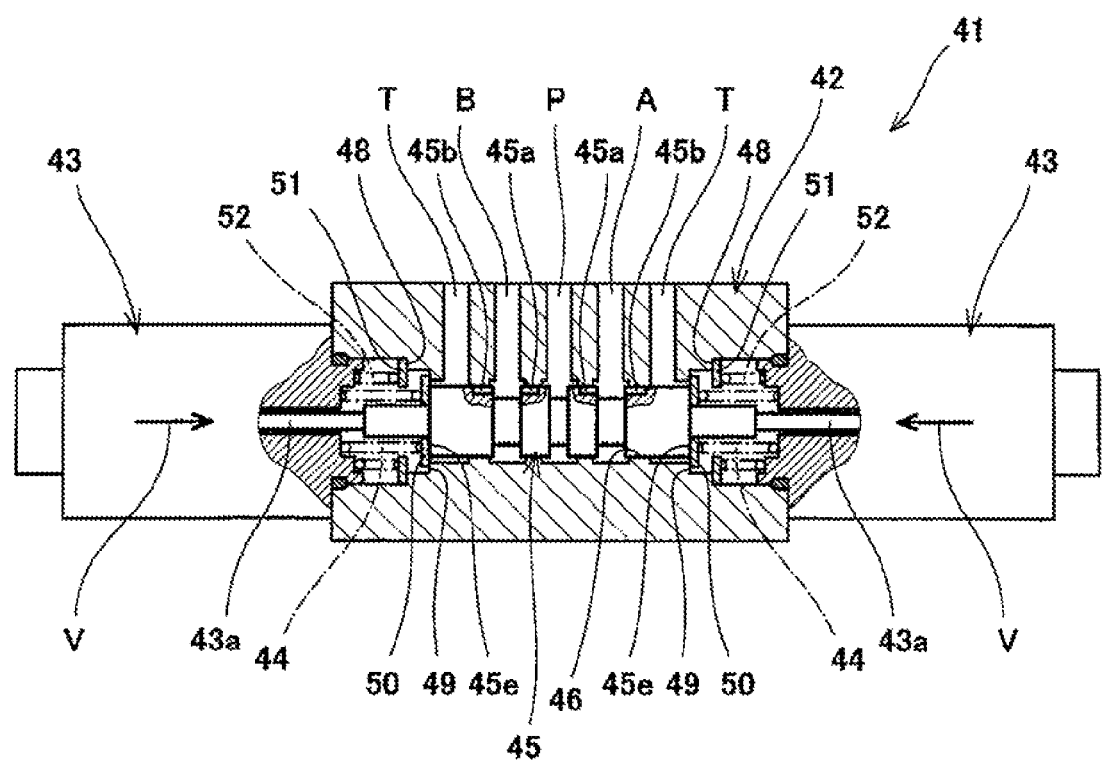
FIGS. 3A and 3B show a spool portion of a proportional solenoid control valve according to Embodiment 3 of the present invention.
Figure 3B:
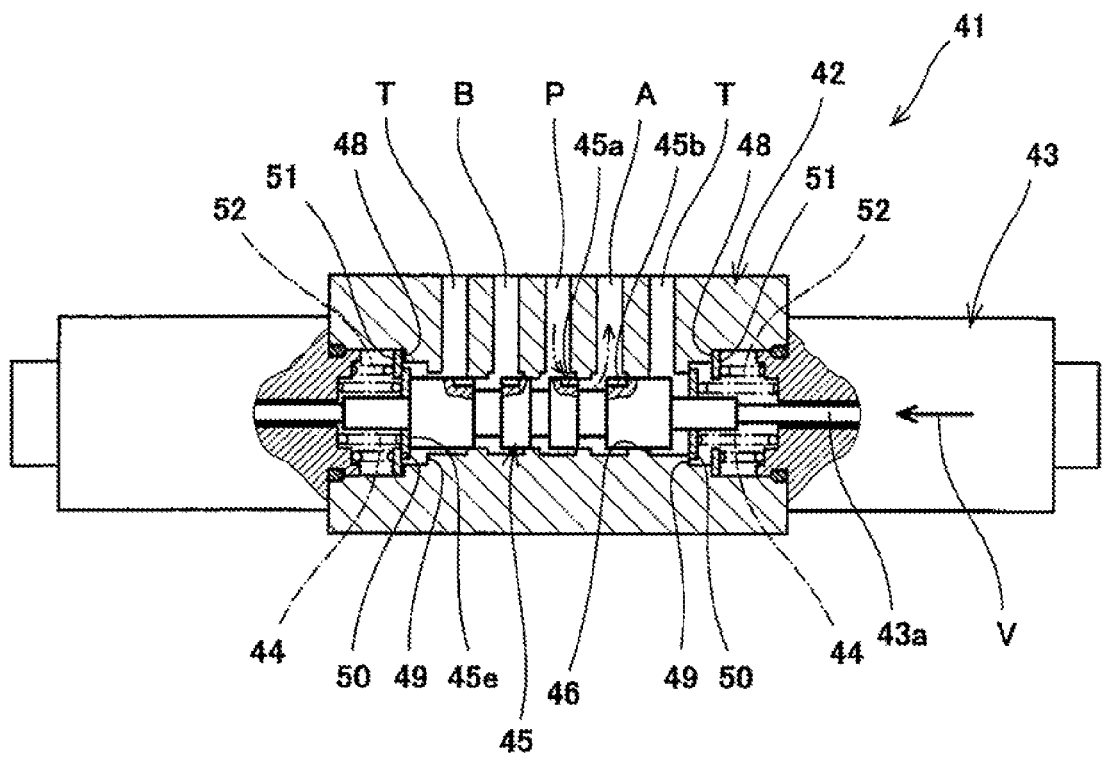

A proportional solenoid control valve 43 according to Embodiment 3 shown in FIGS. 3A and 3B is configured as a dual-drive system, in which electromagnetic proportional solenoids 43 are provided at both (left and right) sides of a valve body 42. It should be noted that, in FIGS. 3A and 3B, the same components as the components described above in Embodiment 1 are denoted by reference numerals that are greater by 40 than the reference numerals of the components described in Embodiment 1, and the description of such common components is omitted.

The proportional solenoid control valve 41, which is in a standby state in FIG. 3A, is configured such that a spool 45 movable in an axial direction inside a spool hole 46 formed in the valve body 42 is driven and controlled so as to be located at a position where driving force exerted in the driving direction V by means of one of driving members 43a of the electromagnetic proportional solenoids 43 provided at both ends of the spool 45 and the spring force of a corresponding one of spool-returning springs 44 provided at both ends of the spool 45, the spring force being exerted in a manner to oppose to the driving force, become equivalent to each other. In this example, the valve body 42 includes return spring locking portions 49. Ring-shaped return spring seats 50 provided at respective shoulder portions 45e of the spool 45 are urged toward the corresponding return spring locking portions 49 by the spring force of the spool-returning springs 44 provided between the electromagnetic proportional solenoids 43 and the return spring seats 50. The return spring seats 50 are locked to the respective shoulder portions 45e of the spool 45, and are movable in the axial direction of the spool 45.

In this example, a pump port P is provided at the central portion of the valve body 42. A first output port A and a second output port B are provided at both outsides of the pump port P. Tank ports T are provided at outsides of these output ports A and B, respectively. By controlling one of the electromagnetic proportional solenoids 43 provided at both sides, the pump port P comes into communication with the first output port A or the second output port B. The flow rate between each port is controlled by the degree of opening of notches 45a and 45b formed in the spool 45.

In the present embodiment, as shown in FIG. 3A, the valve body 42 includes stopper locking portions 48 configured to lock respective ring-shaped mechanical stoppers 51. Stopper-urging springs 52 provided between the mechanical stoppers 51 and the electromagnetic proportional solenoids 43 urge the mechanical stoppers 51 toward the stopper locking portions 48. Thus, in the present embodiment, the stopper-urging springs 52 urge the mechanical stoppers 51 from the electromagnetic proportional solenoid 43 side toward the stopper locking portions 48 of the valve body 42.

In an operating state shown in FIG. 3B, for example, when a current is applied to the right-side electromagnetic proportional solenoid 43 of the proportional solenoid control valve 41, the electromagnetic proportional solenoid 43 generates driving force in the driving direction V. The driving force drives the spool 45 to the left against the spring force of the left-side spool-returning spring 44. Then, when a rated current is applied and the spool 45 reaches the stroke end, the return spring seat 50 previously locked to the return spring locking portion 49 of the spool 45 comes into contact with the stopper 51 locked to the stopper locking portion 48.

Even when the spool 45 is in contact with the stopper 51 via the return spring seat 50, expansion and contraction of the stopper-urging spring 52 allow the spool 45 to vibrate in the axial direction together with the return spring seat 50 and the stopper 51. Therefore, the spool 45 is kept in a state of micro-vibrating owing to current dither. In the drawing, a state where the stopper 51 is away from the stopper locking portion 48 is shown in an exaggerated manner.

Accordingly, even when the spool 45 has reached the stroke end, a state where the spool 45 is micro-vibrating in the axial direction owing to the current dither is maintained. This makes it possible to reduce hysteresis and suppress malfunctioning of the spool 45.

Figure 4A:
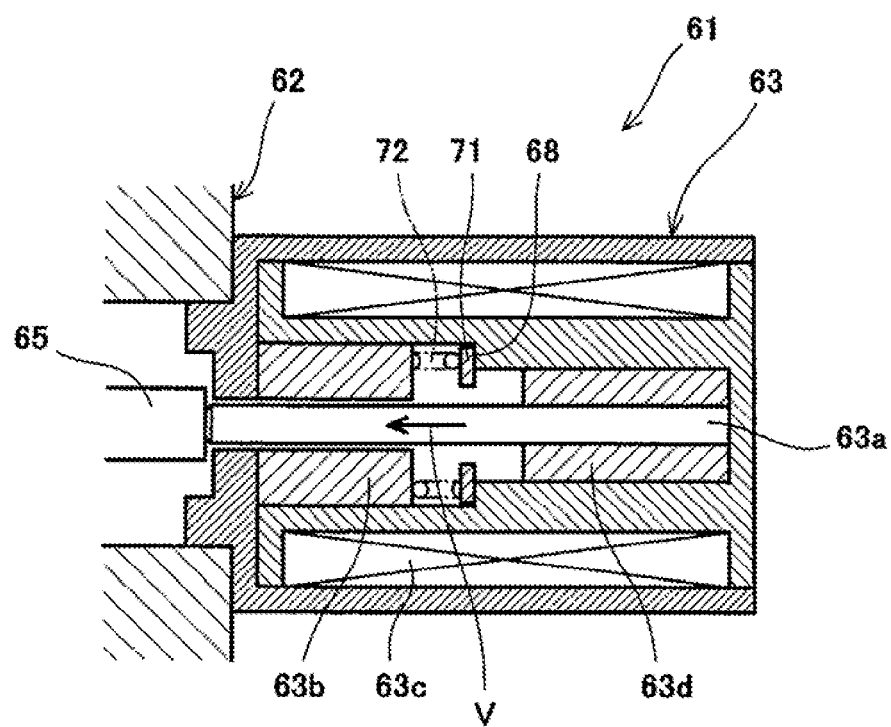
FIGS. 4A and 4B show a driver portion of a proportional solenoid control valve according to Embodiment 4 of the present invention.
Figure 4B:
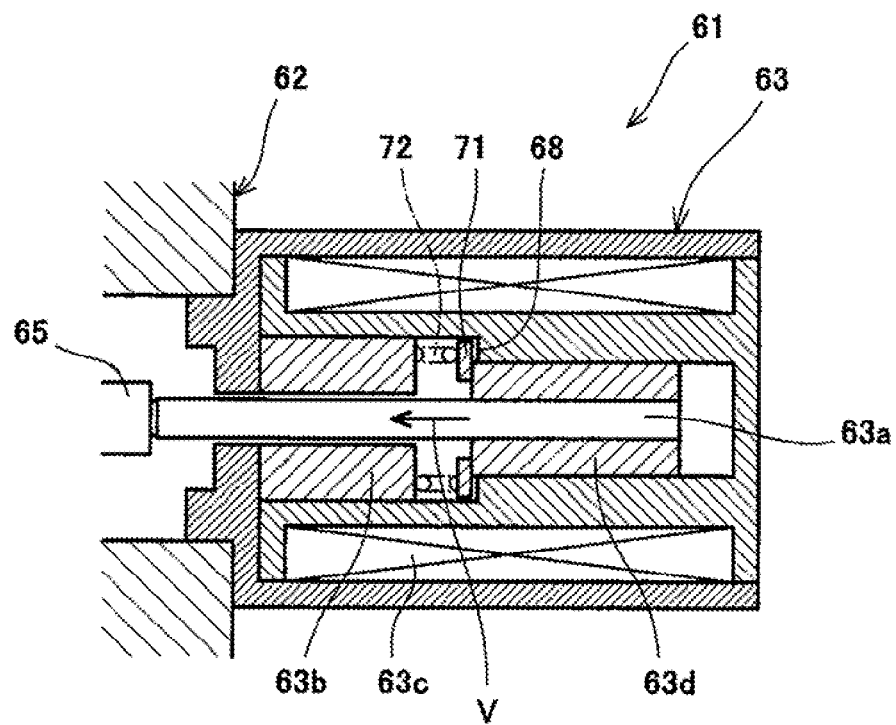

A proportional solenoid control valve 61 according to Embodiment 4 shown in FIGS. 4A and 4B is configured such that a mechanical stopper 71 and a stopper-urging spring 72 are provided inside an electromagnetic proportional solenoid 63. In the present embodiment, the mechanical stopper 71 serves as a stopper for a movable component of the proportional solenoid control valve 61, and a spool 65 is configured such that the spool 65 does not come into contact with any other stoppers. According to this configuration, components such as a valve body 62 and the spool 65 may be such conventional components as described above with reference to FIGS. 7A to 8B. In the present embodiment, a description is given with reference to the drawings that only show portions around the electromagnetic proportional solenoid 63. It should be noted that, in FIGS. 4A and 4B, the same components as the components described above in Embodiment 1 are denoted by reference numerals that are greater by 60 than the reference numerals of the components described in Embodiment 1, and the description of such common components is omitted.

The electromagnetic proportional solenoid 63, which is in a standby state in FIG. 4A, includes: a fixed magnet 63b surrounded by an exciting coil 63c and generating, at its central portion, attracting force in an axial direction in accordance with the magnitude of an excitation current; and a moving core 63d moving in the axial direction by being attracted to the fixed magnet 63b. The moving core 63d moves toward the fixed magnet 63b integrally with a driving member 63a provided in the central portion of the moving core 63d.

The mechanical stopper 71, which is a disc-shaped stopper, is provided at the stroke end of the moving core 63d. The mechanical stopper 71 is configured to be locked to a stopper locking portion 68 provided inside the electromagnetic proportional solenoid 63. The mechanical stopper 71 is urged toward the stopper locking portion 68 by the stopper-urging spring 72 which is provided between the mechanical stopper 71 and the fixed magnet 63b.

In an operating state shown in FIG. 4B, when a current is applied to the exciting coil 63c, the attracting force of the fixed magnet 63b is generated in the driving direction V, and the generated attracting force drives the driving member 63a together with the moving core 63d in the driving direction V. Then, when a rated current is applied, the moving core 63d reaches the stroke end and comes into contact with the mechanical stopper 71.

Even when the moving core 63d is in contact with the mechanical stopper 71, extension and contraction of the stopper-urging spring 72 allow the moving core 63d and the driving member 63a to vibrate in the axial direction. Therefore, the spool 65 is kept in a state of micro-vibrating owing to current dither together with the moving core 63d and the driving member 63a. In FIG. 4B, a state where the stopper 71 is away from the stopper locking portion 68 is shown in an exaggerated manner.

Accordingly, even when the moving core 63d of the electromagnetic proportional solenoid 63 has reached the stroke end, i.e., even when the spool 65 has reached the stroke end, a state where the spool 65 is micro-vibrating in the axial direction owing to the current dither is maintained. This makes it possible to reduce hysteresis and suppress malfunctioning of the spool 65.

Figure 5:
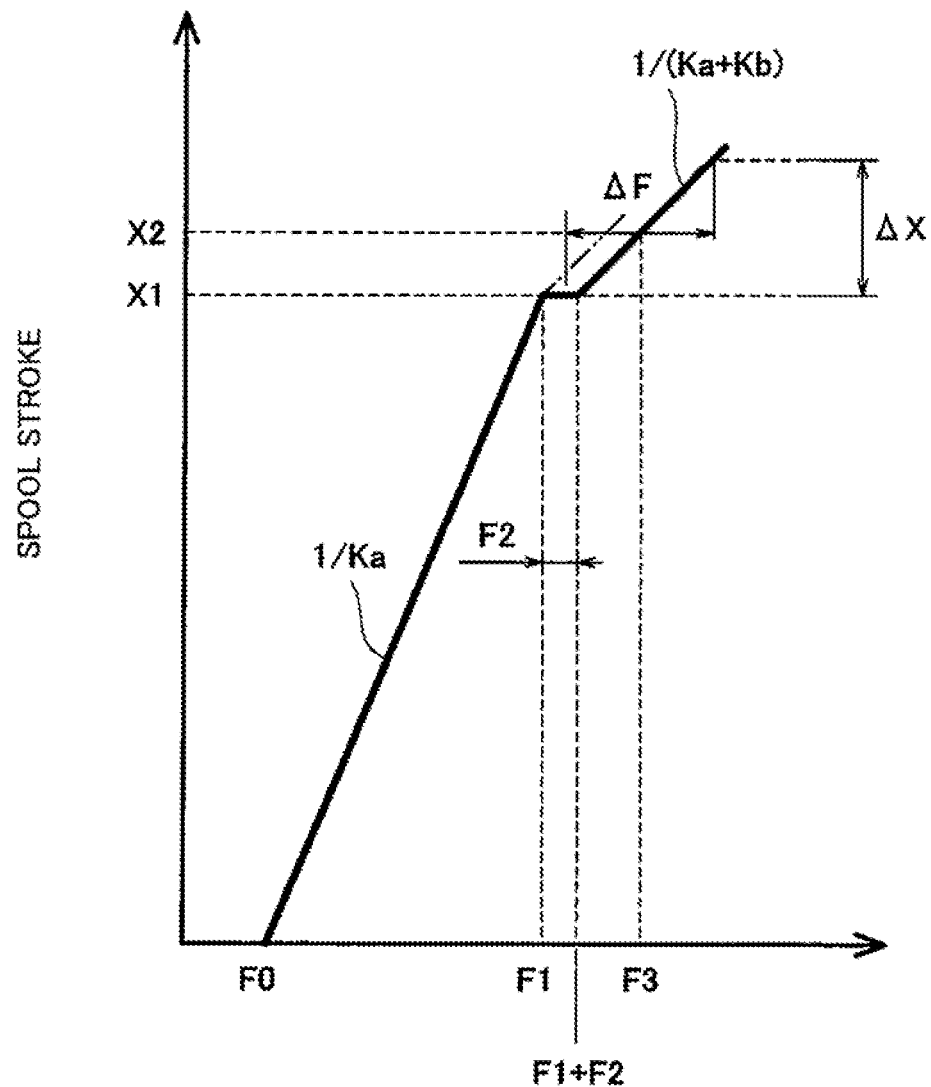
FIG. 5 shows a relationship between driving force of a solenoid and a spool stroke in the present invention.
Figure 6:
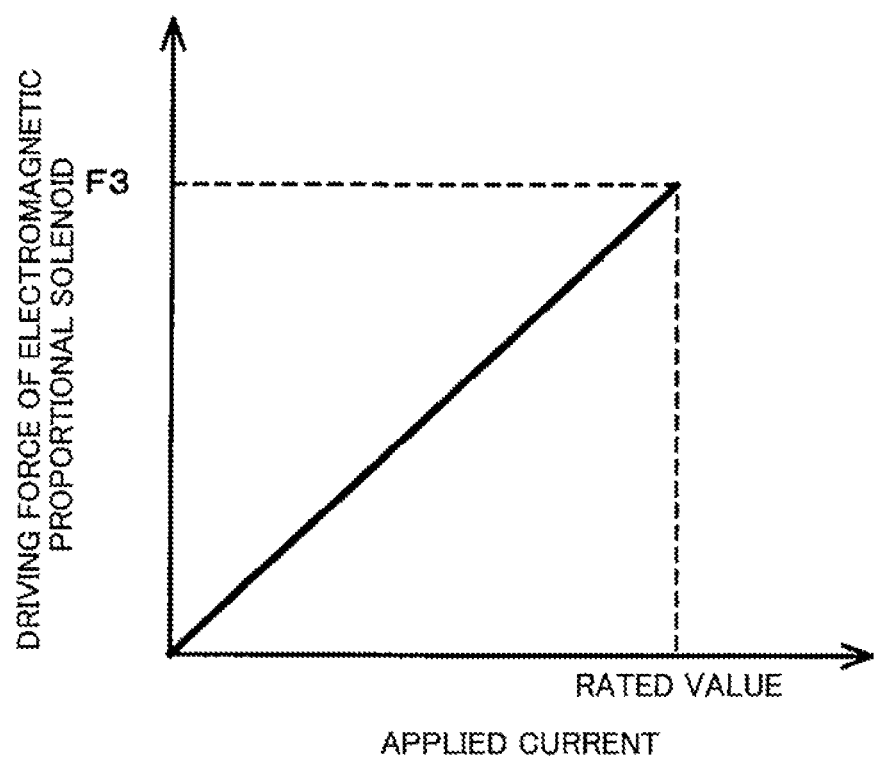
FIG. 6 shows a relationship between an applied current and driving force of a proportional solenoid control valve.
Figure 7A:
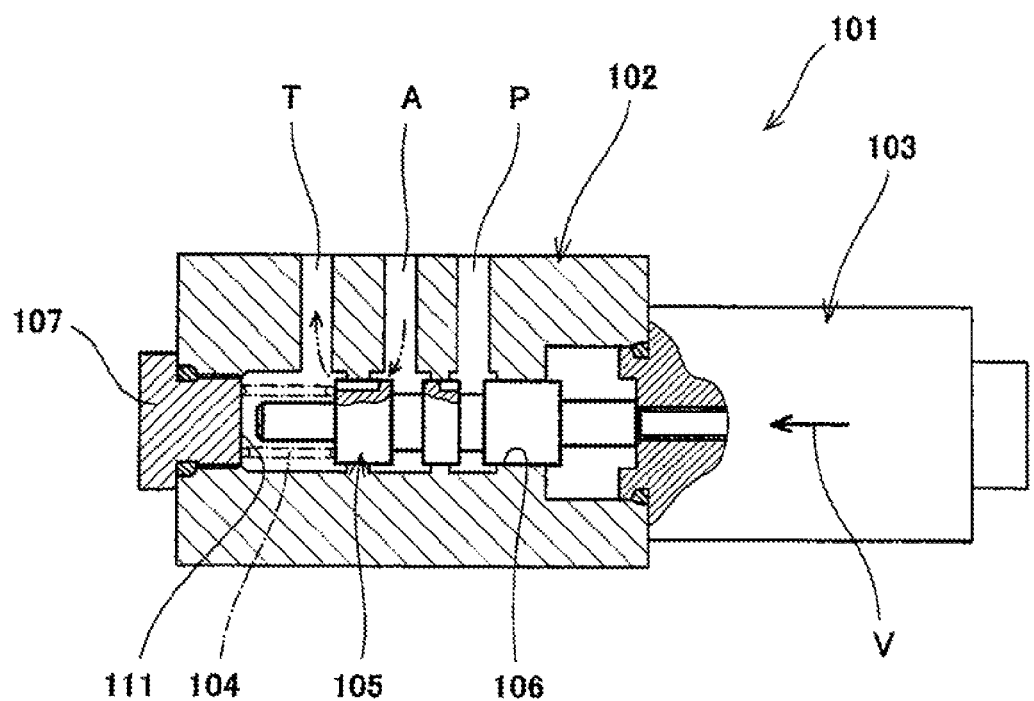
FIGS. 7A and 7B show a spool portion of a proportional solenoid control valve according to a first conventional example.
Figure 7B:
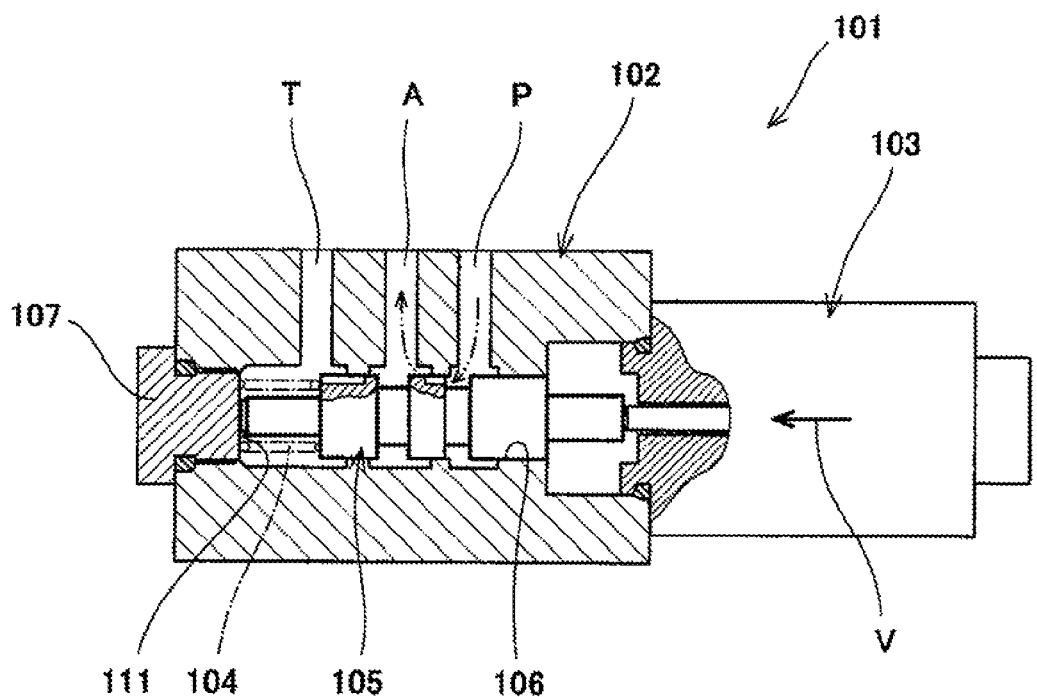
Figure 8A:
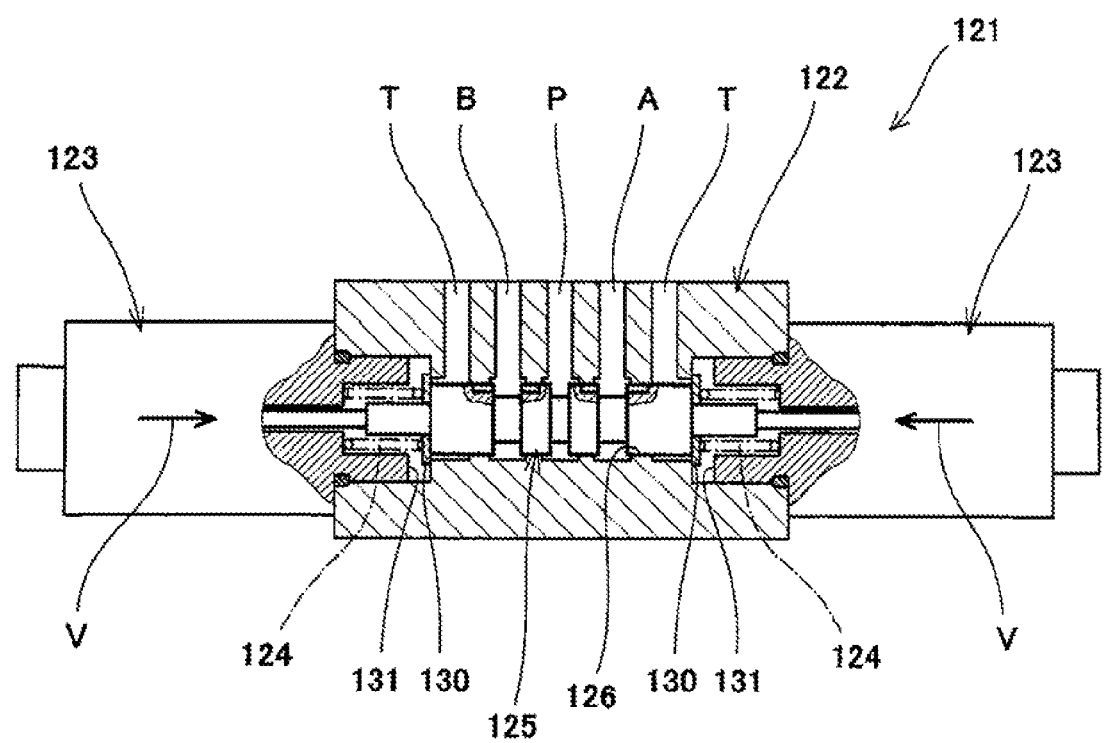
FIGS. 8A and 8B show a spool portion of a proportional solenoid control valve according to a second conventional example.
Figure 8B:
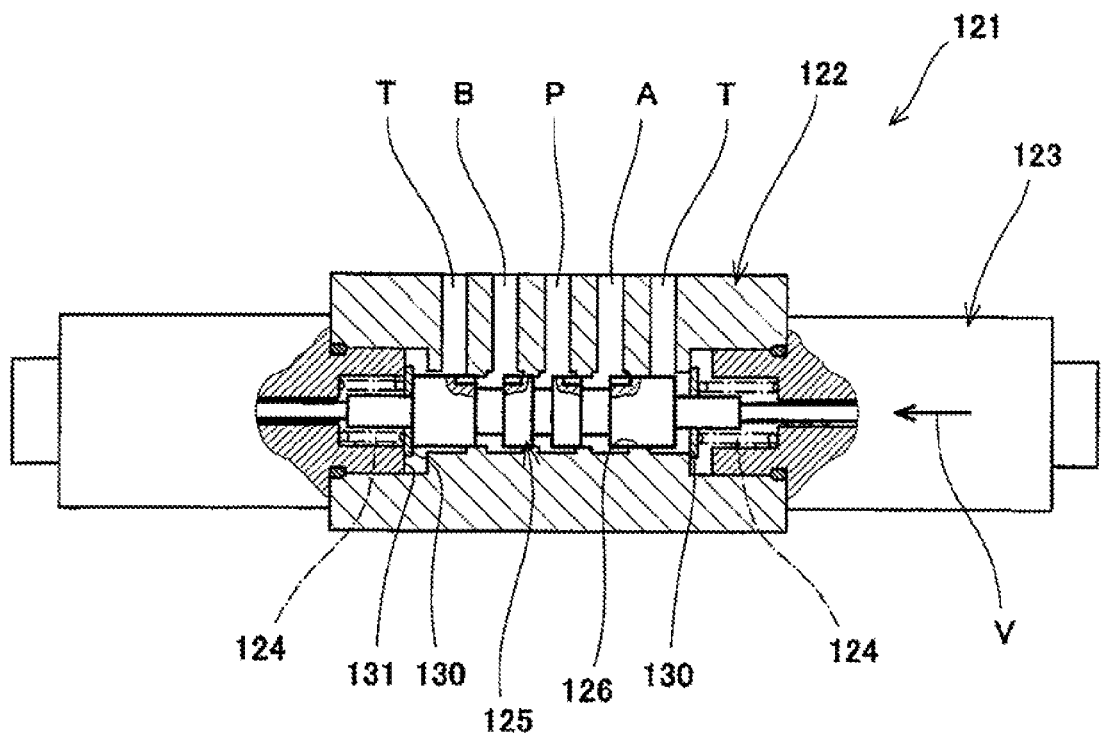
Figure 9:
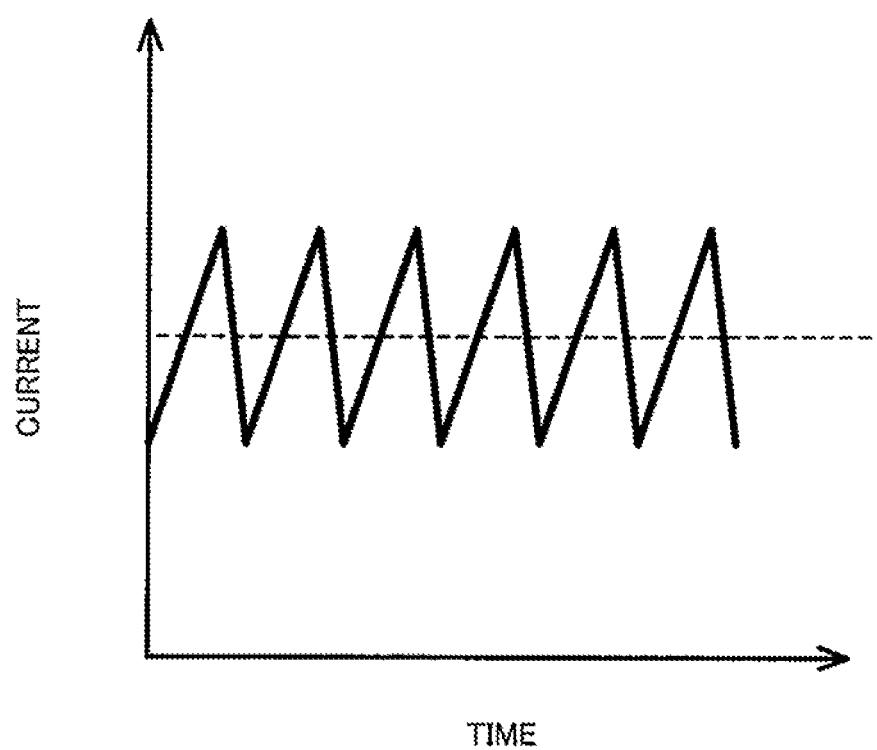
FIG. 9 shows current dither in an applied current to a proportional solenoid control valve.

Next, based on FIG. 5, a description is given of a relationship between the driving force of the electromagnetic proportional solenoids 3, 23, 43 of the proportional solenoid control valves 1, 21, 41 and the stroke of the spools 5, 25, 45. The description below uses the reference signs of the proportional solenoid control valve 1 in the above-described Embodiment 1.

Reference signs shown in FIG. 5 are as follows:
Ka indicates the spring constant of the spool-returning spring;
Kb indicates the spring constant of the stopper-urging spring;
X1 indicates a spool stroke from the neutral position to the stopper;
X2 indicates a spool stroke when the rated current of the solenoid is applied;
F1 indicates the setting load of the spool-returning spring;
F1=F0+Ka·X1, in which F1 indicates the load of the spool-returning spring when in contact with the stopper;
F2 indicates the setting load of the stopper-urging spring;
F3 indicates the driving force of the solenoid when the rated current of the solenoid is applied;
ΔF indicates an amplitude of the driving force of the solenoid, the amplitude being derived from the current dither; and
ΔX indicates an amplitude of the spool stroke, the amplitude corresponding to the amplitude of the driving force.

As shown in FIG. 5, even if the driving force has increased when a control current is applied to the electromagnetic proportional solenoid 3, the spool 5 does not start operating until the driving force exceeds the setting load (initial load) F0 of the spool-returning spring 4. When the driving force exceeds the setting load F0, the stroke of the spool 5 relative to the driving force of the solenoid varies with a slope (1/Ka) corresponding to the spring constant Ka of the spool-returning spring 4.

Thereafter, when the spool 5 comes into contact with the mechanical stopper 11 with the spool stroke (at the stroke end) X1, the spool strike X1 causing the spool 5 at the neutral position to come into contact with the stopper 11, the variation in the stroke of the spool 5 becomes "0" until the driving force of the solenoid reaches a force amount (F1+F2) which is the sum of the load F1 of the spool-returning spring 4 and the setting load (initial load) F2 of the stopper-urging spring 12.

When the driving force of the solenoid reaches "F1+F2", the stroke of the spool 5 varies with a slope of (1/(Ka+Kb)), in which the spring constant Kb of the stopper-urging spring 12 is exerted in addition to the spring constant Ka of the spool-returning spring 4.

Thereafter, the rated current is applied, and when the driving force of the solenoid has become the maximum driving force F3 (while the rated current is being applied), the spool stroke becomes X2 which causes the stopper-urging spring 12 to be deflected by a predetermined amount via the stopper 11. The spool stroke X2 is set so that the spool 5 will not be stroked more than necessary after the spool 5 has reached the stroke end X1 and come into contact with the stopper 11.

When the spool 5 is positioned at the spool stroke X2, the stroke amplitude ΔX is secured at the position of the spool stroke X2 owing to the amplitude ΔF of the solenoid driving force, the amplitude ΔF being derived from the current dither. The setting load F2 of the stopper-urging spring 12 and the spring constant Kb of the stopper-urging spring 12 are set so as to satisfy these two amplitudes ΔF and ΔX.

If the stopper-urging spring setting load F2 shown in FIG. 5 is F2=0, then the stroke amplitude ΔX increases, which makes it possible to obtain a great current dither effect. Therefore, the stopper-urging spring 12 may be designed such that F2=0. In a case where F2 is set to "0", after the spool-returning spring 4 has been deflected to reach the stroke end, the stopper-urging spring 12 can be continuously deflected (indicated by a two-dot chain line shown in FIG. 5), and the amplitude ΔX of the micro vibration of the spool 5 at the stroke end, the micro vibration being derived from the current dither, can be made greater.

Thus, according to the proportional solenoid control valves 1, 21, 41, and 61 of the above-described embodiments, even when the spool 5, 25, 45, or 65 is positioned at the stroke end, the stopper-urging spring 12, 32, 52, or 72 keeps the spool 5, 25, 45, or 65 in a state of micro-vibrating owing to current dither.

Accordingly, the proportional solenoid control valves 1, 21, 41, and 61 are capable of exerting a hysteresis reduction effect around the stroke end of each of the spools (movable components) 5, 25, 45, and 65, and preventing malfunctioning (failed returning) of the spools 5, 25, 45, and 65. Thus, the proportional solenoid control valves 1, 21, 41, and 61 are capable of operating in a stable manner.

Hysteresis increase and malfunctioning tend to occur in a structure in which driving force is weak. However, according to the above embodiments, even if each proportional solenoid control valve is configured by using a compact electromagnetic proportional solenoid with weak driving force, hysteresis increase and the spool's failed returning can be suppressed. This makes it possible to realize a compact structure of the proportional solenoid control valve.

Further, even in the case of a pilot-type proportional solenoid control valve, the control valve can be configured as a valve with small spool driving force, such that the main spool is driven with low pilot pressure. This makes it possible to realize a compact pilot-type proportional solenoid control valve, in which the size of springs and a proportional solenoid pressure-reducing valve is reduced.

The above embodiments have been described by taking flow control valves as examples of the proportional solenoid control valves 1, 21, 41, and 61. However, the proportional solenoid control valves are not limited to flow control valves, but may be pressure control valves.

Although in the above embodiments coil springs are used as the stopper-urging spring 12, 32, 52, and 72 which serve as resilient members, the resilient members are not limited to coil springs, but may be, for example, disc springs or different members having spring properties. Thus, the resilient members are not limited to the above embodiments.

The above-described embodiments merely indicate examples. Various changes may be made without departing from the spirit of the present invention. Thus, the present invention is not limited to the above-described embodiments.

INDUSTRIAL APPLICABILITY

The proportional solenoid control valve according to the present invention is useful when the proportional solenoid control valve is required to perform stable control over the entire control range including the stroke end of the spool.

REFERENCE SIGNS LIST

1 proportional solenoid control valve
2 valve body
3 electromagnetic proportional solenoid (driver)
3a driving member
4 spool-returning spring (return spring)
5 spool (movable component)
6 spool hole (sliding hole)
7 closing member
8 stopper locking portion.
11 mechanical stopper
12 stopper-urging spring
21 proportional solenoid control valve
22 valve body
23 electromagnetic proportional solenoid (driver)
24 spool-returning spring (return spring)
25 spool (movable component)
26 spool hole (sliding hole)
28 stopper locking portion
31 mechanical stopper
32 stopper-urging spring
33 flange
41 proportional solenoid control valve
42 valve body
43 electromagnetic proportional solenoid (driver)
44 spool-returning spring (return spring)
45 spool (movable component)
46 spool hole (sliding hole)
48 stopper locking portion
49 return spring locking portion
50 return spring seat
51 mechanical stopper
52 stopper-urging spring
61 proportional solenoid control valve
63 electromagnetic proportional solenoid (driver)
65 spool (movable component)
71 mechanical stopper
72 stopper-urging spring
P pump port
A output port
B output port
T tank port
V driving direction

The invention claimed is:

1. A proportional solenoid control valve including: a driver including a driving member driven by an applied current to the driver and a moving core connected to the driving member; a movable component moved by the driving member; a valve body disposed outside the driver and including a sliding hole formed therein, the sliding hole allowing the movable component to move therein; and a return spring configured to urge the movable component in an opposite direction to a driving direction of the driving member, the proportional solenoid control valve being configured to cause, by current dither, the applied current to the driver to micro-vibrate, the proportional solenoid control valve comprising:

a flange provided on an end of the movable component and moving together with the movable component, the end being adjacent to the driver;

a mechanical stopper configured to limit displacement of the movable component; and a stopper-urging spring provided between the flange and the mechanical stopper, the stopper-urging spring urging the mechanical stopper in the driving direction of the driving member and allowing the movable component to vibrate owing to the current dither when the mechanical stopper is in contact with a stopper locking portion formed in the valve body, wherein the proportional solenoid control valve is configured as a single-drive system in which the driver is provided at an end of one side of the movable component, and the mechanical stopper and the stopper-urging spring are provided between the end of the movable component and the valve body.

2. The proportional solenoid control valve according to claim 1, wherein a spring constant and a setting load of the stopper-urging spring are set such that a vibration amplitude of the movable component, the vibration amplitude being derived from the current dither, is secured.

* * * * *